US012756171B2

(12) United States Patent
Chae et al.

(10) Patent No.: US 12,756,171 B2
(45) Date of Patent: Oct. 6, 2026

(54) JOINTING SYSTEM OF POWER CABLE

(71) Applicant: LS CABLE & SYSTEM LTD., Anyang-si (KR)

(72) Inventors: Byung Ha Chae, Seoul (KR); Chae Hong Kang, Gumi-si (KR); Si Ho Son, Daegu (KR); Seung Myung Choi, Gumi-si (KR); Ho Jung Yun, Seoul (KR); Kuniaki Sakamoto, Gumi-si (KR)

(73) Assignee: LS CABLE & SYSTEM LTD., Anyang-si (KR)

( * ) Notice: Subject to any disclaimer, the term of this patent is extended or adjusted under 35 U.S.C. 154(b) by 890 days.

(21) Appl. No.: 17/291,202

(22) PCT Filed: Oct. 25, 2019

(86) PCT No.: PCT/KR2019/014111
§ 371 (c)(1),
(2) Date: May 3, 2023

(87) PCT Pub. No.: WO2020/096241
PCT Pub. Date: May 14, 2020

(65) Prior Publication Data
US 2024/0047956 A1 Feb. 8, 2024

(30) Foreign Application Priority Data
Nov. 7, 2018 (KR) ........................ 10-2018-0135920
Oct. 23, 2019 (KR) ........................ 10-2019-0131857

(51) Int. Cl.
*H02G 15/103* (2006.01)
*H02G 15/184* (2006.01)
*H02G 15/24* (2006.01)

(52) U.S. Cl.
CPC ......... *H02G 15/103* (2013.01); *H02G 15/184* (2013.01); *H02G 15/24* (2013.01)

(58) Field of Classification Search
CPC .... H02G 15/103; H02G 15/18; H02G 15/184; H02G 15/24; H01B 7/02; H01B 9/02
See application file for complete search history.

(56) References Cited

U.S. PATENT DOCUMENTS 3,242,255 A * 3/1966 Falkenstein ............ H02G 15/22 174/76
4,110,550 A * 8/1978 Di Pietro ............. H02G 15/103 29/882
(Continued)

FOREIGN PATENT DOCUMENTS

CH 377899 A 5/1964
CN 104065021 A 9/2014
(Continued)

OTHER PUBLICATIONS

Extended European Search Report for related European Application No. 19882606.7; action dated Jul. 4, 2022; (10 pages).
(Continued)

*Primary Examiner* — Timothy J Thompson
*Assistant Examiner* — Rhadames Alonzo Miller
(74) *Attorney, Agent, or Firm* — K&L Gates LLP

(57) ABSTRACT

The present disclosure relates to a joint system of a power cable, in which pressure-resistance performance of a boundary area between a power cable and a joint box for connecting power cables is improved.

20 Claims, 9 Drawing Sheets

(56) References Cited

U.S. PATENT DOCUMENTS

| | | | | | |
|---|---|---|---|---|---|
| 4,515,991 | A * | 5/1985 | Hutchison | H02G 3/0616 | 29/858 |
| 4,549,037 | A * | 10/1985 | Bawa | H02G 3/088 | 174/667 |
| 4,912,815 | A * | 4/1990 | Jenkins | G02B 6/4445 | 24/122.3 |
| 5,187,009 | A * | 2/1993 | Kimura | H02G 15/003 | 526/240 |
| 5,691,505 | A * | 11/1997 | Norris | H02G 15/04 | 439/98 |
| 6,537,104 | B1 * | 3/2003 | Hagmann | H02G 15/04 | 439/461 |
| 6,809,263 | B2 * | 10/2004 | Jackson | H02G 3/065 | 174/651 |
| 6,812,406 | B2 * | 11/2004 | Hand | H02G 3/0666 | 174/667 |
| 7,563,993 | B2 * | 7/2009 | Drotleff | H02G 15/007 | 174/653 |
| 7,749,021 | B2 * | 7/2010 | Brodeur | H01R 13/59 | 174/359 |
| 7,781,685 | B2 * | 8/2010 | Bartholoma | H01R 13/5205 | 174/654 |
| 9,306,382 | B2 * | 4/2016 | Ladié | H02G 15/24 | |
| 10,014,678 | B2 * | 7/2018 | Barrett | H02G 15/105 | |
| 10,637,176 | B1 * | 4/2020 | Campbell | H01R 13/5816 | |
| 2013/0217251 | A1 * | 8/2013 | Lin | H02G 15/013 | 439/275 |
| 2014/0102780 | A1 * | 4/2014 | Aldrich | H02G 3/083 | 174/653 |
| 2015/0222107 | A1 * | 8/2015 | Jackson | H02G 15/007 | 174/142 |
| 2017/0059795 | A1 * | 3/2017 | Camarda | H02G 3/22 | |
| 2017/0261709 | A1 * | 9/2017 | Camarda | H05K 5/06 | |
| 2018/0128400 | A1 * | 5/2018 | Twelves | H02G 15/013 | |
| 2018/0138686 | A1 * | 5/2018 | León-Guarena | H02G 3/0481 | |
| 2018/0301885 | A1 * | 10/2018 | Jackson | H02G 15/013 | |
| 2020/0144799 | A1 * | 5/2020 | Lakerdas | H02G 3/0437 | |
| 2021/0344132 | A1 * | 11/2021 | Pavlovic | H01R 13/055 | |

FOREIGN PATENT DOCUMENTS

| | | | |
|---|---|---|---|
| EP | 2197080 | A1 | 6/2010 |
| JP | 05011735 | U | 2/1993 |
| JP | 2002209320 | A | 7/2002 |
| KR | 1020120038177 | A | 4/2012 |
| KR | 101830030 | B1 | 2/2018 |
| KR | 1020180111457 | A | 10/2018 |
| RU | 2097891 | C1 | 11/1997 |

OTHER PUBLICATIONS

International Search Report for related International Application No. PCT/KR2019/014111; report dated May 14, 2020; (5 pages).

Written Opinion for related International Application No. PCT/KR2019/014111; report dated May 14, 2020; (5 pages).

Office Action for related European Application No. 19882606.7; action dated Dec. 10, 2024; (10 pages).

* cited by examiner

JOINTING SYSTEM OF POWER CABLE

CROSS-REFERENCE TO RELATED APPLICATIONS

The present application is a National Stage of International Application No. PCT/KR2019/014111 filed on Oct. 25, 2019, which claims the benefit of Korean Patent Application No. 10-2018-0135920 filed on Nov. 7, 2018, and Korean Patent Application No. 10-2019-0131857 filed Oct. 23, 2019, filed with the Korean Intellectual Property Office, the entire contents of each hereby incorporated by reference.

FIELD

The present disclosure relates to a joint system of a power cable. More specifically, the present disclosure relates to a joint system of a power cable, in which pressure-resistance performance of a boundary area between a power cable and a joint box for connecting power cables is improved.

BACKGROUND

In general, power cables are installed under or on the ground or at the sea bottom to supply power to a desired place using a conductor that supplies power.

The power cables are connected at intervals of several hundred meters or tens of kilometers through a joint box, and the ends of the power cables are connected to an overhead line through a termination connection box.

FIG. 1 is a cross-sectional view of a joint system 1' of a power cable of the related art.

Referring to FIG. 1, in order to a connect a power cable 100 through a joint box 200, a conductor 11 of the power cable 100 is first connected in a state in which a cable insulating layer 14 of the power cable 100 is exposed, a surface of the cable insulating layer 14 is covered with insulating paper to form a reinforced insulating layer 250, and thereafter an outer semiconducting layer 16, a metal sheath 22, and the like are disposed. A metal strip layer 26 and a cable armor 30 may be provided outside a metal sheath 22 of the power cable 100.

The reinforced insulating layer 250 is provided by winding insulating paper around the cable insulating layer 14, a joint-box outer semiconducting layer 230 and the outer semiconducting layer 16 of the power cable 100 are connected, and the joint box 200 is covered with a protective copper tube 260 to protect the inside of the joint box 200.

A large amount of insulation oil is injected into an internal space E of the protective copper tube 260 of the joint box 200 having the above configuration. When the joint system of a power cable 1' to which a cable is connected through the joint box 200 is operated, the joint system of a power cable 1' may be vibrated due to current flowing through the cable at high voltage. To prevent movement of the joint box 200 due to the vibration of the joint system 1', the joint box 200 may be gripped and fixed.

The volume of the insulating oil in the protective copper tube 260 may repeatedly expand and contract according to a heating cycle of the joint system of a power cable 1', thereby causing a change of an internal pressure of the joint box 200. As described above, when the protective copper tube 260 is formed to be long to grip the joint box 200 and thus the amount of the insulating oil in the protective copper tube 260 increases, the protective copper tube 260 or the leaded part 261 (a portion of the protective copper tube 260 in contact with the metal sheath 22 of the power cable 100) may be broken due to an excessive increase in internal pressure or a fatigue failure of the protective copper tube 260 or the leaded part 261 may occur due to repetitive internal expansion and shrinkage, thereby causing the leakage of the insulating oil and dielectric breakdown.

SUMMARY

The present disclosure is directed to providing a joint system of a power cable, in which pressure-resistance performance of a boundary area between a power cable and a joint box for connecting power cables is improved.

The present disclosure provides a joint system of a power cable, which includes a joint box for connection of a pair of power cables, the joint system comprising: a pair of power cables connected to each other such that conductors, inner semiconducting layers, insulating layers formed of insulating paper, outer semiconducting layers, metal sheaths, and metal strip layers thereof are exposed and the conductors face each other; a conductor connection part to which the exposed conductors of the pair of power cables are connected; a reinforcing insulating layer configured to cover the conductor connection part and the exposed insulating layers of the pair of power cables; a joint-box outer semiconducting layer provided outside the reinforcing insulating layer to be connected to the exposed outer semiconducting layers of the pair of power cables; a protective copper tube provided outside the joint-box outer semiconducting layer and filled with insulating oil; a leaded part provided at boundary area between the power cable and the protective copper tube while in contact with end portions of the protective copper tube and the metal sheath; and a leaded-part reinforcing part configured to cover at least a portion of a surface of the leaded part.

And both sides of the protective copper tube may be inclined sides, lower ends of the both sides of the protective copper tube are in contact with the exposed metal sheath of the power cable, and the leaded part may cover the lower ends of the both sides of the protective copper tube and a portion of the exposed metal sheath of the power cable.

And a reinforcing member of the leaded-part reinforcing part continuously may cover at least a portion of an outer circumferential surface of the leaded part and at least a portion of the exposed metal sheath of the power cable.

And the reinforcing member of the leaded-part reinforcing part may cover at least a portion of a side of the protective copper tube in a radial direction of the power cable.

And the reinforcing member of the leaded-part reinforcing part may cover at least 20 percentages of the side of the leaded part covering the protective copper tube in a longitudinal direction of the power cable.

And the reinforcing member of the leaded-part reinforcing part may cover a region of the metal strip layer, including an end portion of the exposed metal strip layer.

And the reinforcing member of the leaded-part reinforcing part may cover the entire exposed metal strip layer.

And the joint system of a power cable may further comprise a taping reinforcing layer in at least a region of an area in which the reinforcing member and the metal sheath overlap each other.

And the taping reinforcing layer may be formed by cross-winding a tape, to which a tensile fiber is added, in at least one layer around the outer circumferential surface of the metal sheath.

And the reinforcing member may comprise a tin-plated annealed copper wire.

And the tin-plated annealed copper wire may have a width of 1.0 mm to 3.0 mm.

And the tin-plated annealed copper wire may be cross-wound in multiple layers in a radial direction of the power cable.

And a cross section of the reinforcing member may have a circular shape, an elliptical shape, a track shape, or a polygonal shape with rounded corners.

And a plurality of reinforcing members of a leaded-part reinforcing part may be connected by being joined together.

And a cross-section of at least one of a plurality of reinforcing members may be different from those of the other reinforcing members.

And a cross section of a reinforcing member covering the exposed metal sheath among the plurality of reinforcing members may have a tetragonal shape with rounded corners.

And The joint system may further comprise a metal-sheath reinforcing part including the reinforcing member covering an end portion of the metal sheath exposed inside the protective copper tube.

And the taping reinforcing layer may extend to a region including an end of the metal strip layer.

And the present disclosure provides a joint system of a power cable, which includes a joint box for connection of a pair of power cables, the joint system comprising: a pair of power cables connected to each other such that conductors, inner semiconducting layers, insulating layers formed of insulating paper, outer semiconducting layers, metal sheaths, and metal strip layers are exposed, and the conductors face each other; a conductor connection part to which the exposed conductors of the pair of power cables are connected; a reinforcing insulating layer configured to cover the conductor connection part and the exposed insulating layers of the pair of power cables; a joint-box outer semiconducting layer provided outside the reinforcing insulating layer to be connected to the exposed outer semiconducting layers of the pair of power cables; a protective copper tube provided outside the joint-box outer semiconducting layer and filled with insulating oil; and a metal-sheath reinforcing part including a reinforcing member configured to cover an end portion of the metal sheath inside the protective copper tube.

And the joint system may further comprise a leaded part located in a boundary area between the power cable and an outer end of the protective copper tube while in contact with the protective copper tube and the metal sheath; and a leaded-part reinforcing part located on at least a portion of a surface of the leaded part.

And a reinforcing member of the leaded-part reinforcing part continuously may cover at least a portion of an outer circumferential surface of the leaded part and at least a portion of the exposed metal sheath of the power cable.

And the reinforcing member of the leaded-part reinforcing part may cover an end region of the exposed metal strip layer.

And the reinforcing member may comprise a tin-plated annealed copper wire.

And the tin-plated annealed copper wire may have a diameter of 1.0 mm to 3.0 mm, may have a cross section having a circular shape, an oval shape, a track shape, or a polygonal shape with rounded corners, type, and is cross-wound in multiple layers in a radial direction of the power cable.

And the joint system may further comprise a taping reinforcing layer in at least a region of an area in which the reinforcing member and the metal sheath overlap each other.

And the present disclosure provides a joint system of a power cable, which includes a joint box for connection of a pair of power cables, wherein the pair of power cables are connected to each other such that conductors, inner semiconducting layers, insulating layers formed of insulating paper, outer semiconducting layers, metal sheaths, and metal strip layers are exposed, and the conductors face each other, the joint box comprises: a conductor connection part configured to connect the pair of the exposed conductors; a reinforcing insulating layer configured to cover the conductor connection part and the insulating layers of the pair of power cables; a joint-box outer semiconducting layer provided outside the reinforcing insulating layer to be connected to the outer semiconducting layers of the pair of power cables; and a protective copper tube provided outside the joint-box outer semiconducting layer and filled with insulating oil, the joint system further comprises: a leaded part provided in a boundary area between the power cable and the protective copper tube; and a reinforcing member configured to continuously cover an end region of the metal sheath inside the protective copper tube or at least a portion of an outer circumferential surface of the leaded part and at least a portion of the metal sheath of the power cable.

In a joint system of a power cable according to the present disclosure, pressure-resistance performance of a boundary area between a power cable and a joint box for connecting power cables can be improved.

In addition, in the joint system of a power cable according to the present disclosure, pressure-resistance performance can be improved by adding a reinforcing member to a leaded part without changing a structure of a joint box.

DETAILED DESCRIPTION

Hereinafter, embodiments of the present disclosure will be described in detail with reference to the accompanying drawings. The present disclosure is, however, not limited thereto and may be embodied in many different forms. Rather, the embodiments set forth herein are provided so that this disclosure may be thorough and complete and fully convey the scope of the disclosure to those skilled in the art. Throughout the specification, the same reference numbers represent the same elements.

Figure 1:
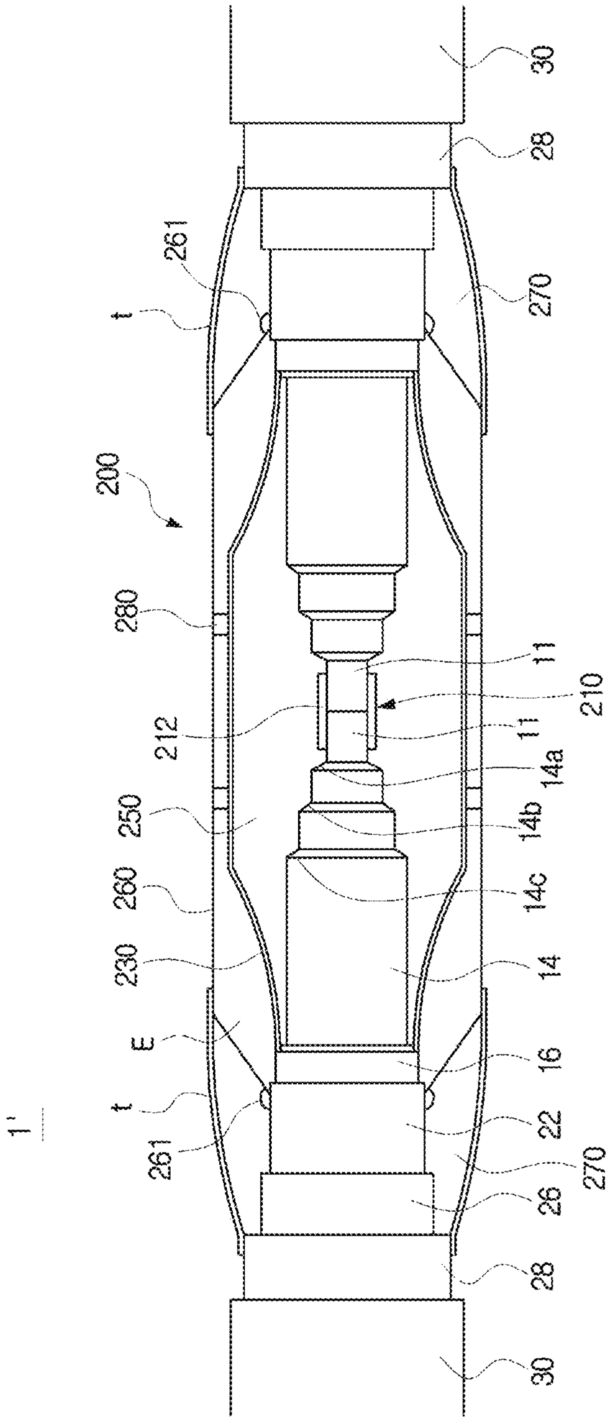
FIG. 1 is a cross-sectional view of a joint system of a power cable of the related art.
Figure 2:
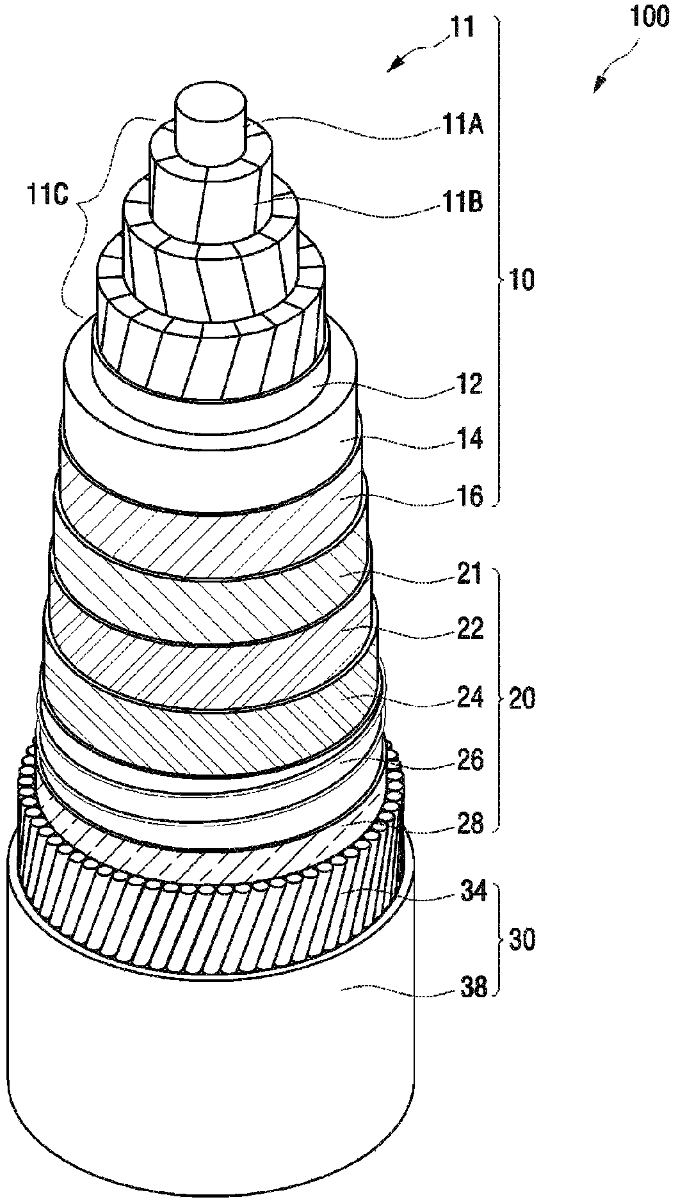
FIG. 2 is a partially cutaway perspective view of a power cable to be laid at the sea bottom.

FIG. 2 is a perspective view illustrating an internal configuration of a power cable 100.

In general, cables impregnated with insulating oil are connected through a joint box 200 at intervals of several hundreds of meters or several kilometers and the ends thereof are connected to an overhead line through the joint box 200. First, the power cable 100 impregnated with insulating oil and a joint system 1 of a power cable for connection of such power cables will be described below.

FIG. 2 is a partially cutaway perspective view of the power cable 100 to be laid at the sea bottom.

Referring to FIG. 2, the power cable 100 to be laid at the bottom includes a cable core part 10, which includes a conductor 11, an inner semiconducting layer 12, a cable insulating layer 14, and an outer semiconducting layer 16, transmits power along the conductor 11 only in a longitudinal direction of the power cable 100, and prevents leakage of current in a radial direction of the power cable 100.

The conductor 11 acts as a path through which current flows to transmit power, and may be formed of a material, e.g., copper or aluminum, having high conductivity to minimize power loss and having strength and flexibility appropriate to manufacture and use a cable.

As illustrated in FIG. 2, the conductor 11 may be a flat conductor 11 that includes a flat wire layer 11*c* consisting of a round central wire 11*a* and a flat wire 11*b* twisted to cover the round central line 11*a*, and that has an overall round cross section. As another example, the conductor 11 may be a circular compressed conductor 11 obtained by compressing a plurality of round wires into a circular shape. The flat conductor 11 has a higher space factor than that of the circular compressed conductor 11 and thus may contribute to reduction of an outer diameter of a cable.

Because the conductor 11 is formed by twisting a plurality of wires, a surface thereof is not smooth and thus an electric field may not be uniform and a corona discharge is likely to occur locally. When there is a gap between the surface of the conductor 11 and the cable insulating layer 214 described below, insulation performance may decrease.

In order to solve this problem, the inner semiconducting layer 212 may be provided outside the conductor 11. The inner semiconducting layer 12 may include an insulating material to which conductive particles such as carbon black, carbon nanotubes, carbon nanoplates, or graphite are added and thus may have a semiconductive property.

The inner semiconducting layer 12 may prevent a sudden change in an electric field between the conductor 11 and the cable insulating layer 14 described below, thereby stabilizing insulation performance. In addition, the inner semiconducting layer 12 may suppress a non-uniform charge distribution on a surface of the conductor 11 to achieve a uniform electric field, and prevent a gap between the conductor 11 and the cable insulating layer 14 to suppress a corona discharge, dielectric breakdown, etc.

The cable insulating layer 14 is provided outside the inner semiconducting layer 12 to electrically insulate the inner semiconducting layer 12 from the outside so that current flowing through the conductor 11 may not leak to the outside.

The cable insulating layer 14 may include insulating paper impregnated with insulating oil. That is, the cable insulating layer 14 may be formed by winding insulating paper in multiple layers to surround the inner semiconducting layer 12 and impregnating the insulating paper with insulating oil after the cable core part 10 is formed. As the insulating oil is absorbed by the insulating paper, insulating characteristics of the cable insulating layer 14 may be improved.

The insulating oil improves insulating characteristics when gaps in the insulating paper and gaps between layers generated by winding the insulating paper are filled with the insulating oil, and reduces a frictional force between the layers of the insulating paper when the power cable 100 is bent, thereby improving bendability of the power cable 100.

When insulating oil having relatively low viscosity is used, it is necessary to pressurize the insulating oil using oiling facility or the like to maintain a state in which the insulating paper is impregnated with the insulating oil and prevent gaps in the cable insulating layer 14 due to the flow of the insulating oil. However, when insulating oil having relatively high viscosity is used, a flow rate of the insulating oil is low and thus oiling facility is not needed to pressurize the insulating oil or the number of pieces of oiling facility may be reduced to increase a length of a cable to be extended. For example, at least one selected from the group consisting of naphthenic insulating oil, polystyrene insulating oil, mineral oil, alkyl benzene or polybutene synthetic oil, heavy alkylate, and the like may be used as the insulating oil.

The insulating paper may be Kraft paper obtained by removing organic electrolyte in Kraft pulp or composite insulating paper obtained by adhering Kraft paper onto one side or both sides of a plastic film.

Specifically, the cable insulating layer 14 may be provided by winding only Kraft paper and impregnating the wound Kraft paper with insulating oil. In this case, the insulating oil may flow in a direction in which load is applied to the power cable 100, thereby causing gaps. On the other hand, when the cable insulating layer 14 is formed by winding composite insulating paper and impregnating the composite insulating paper with the insulating oil, thermoplastic resin such as polypropylene resin is not impregnated with the insulating oil and may thermally expand according to an impregnation temperature during the manufacture of a cable or an operating temperature during an operation of the cable. When the thermoplastic resin thermally expands, surface pressure is applied to a plurality of pieces of stacked Kraft paper, thus reducing a flow path of the insulating oil, and therefore, the insulating oil may be suppressed from flowing due to gravity or contraction/expansion of the insulating oil. In addition, the composite insulating paper has higher dielectric strength than that of Kraft paper and thus contribute to a reduction of an outer diameter of a cable.

When electric current is supplied to the power cable 100, the conductor 11 serving as a path through which the electric current flows is heated and the temperature thereof gradually reduces from an inner side thereof to an outer side thereof in the radial direction of the power cable 100, thereby causing a temperature difference in the cable insulating layer 14. Therefore, the insulating oil in a portion of the cable insulating layer 14 right above the conductor 11, i.e., a portion of the cable insulating layer 14 on the inner semiconducting layer 12, reduces in viscosity and thermally expands and thus moves outwards. When a temperature of the power cable 100 reduces, the viscosity of the insulating oil increases and does not return to an original state and thus gaps may occur in the portion of the cable insulating layer 14 right above the conductor 11.

The outer semiconducting layer 16 may be provided outside the cable insulating layer 14. Similar to the inner semiconducting layer 12, the outer semiconducting layer 16 is formed of a material having a semiconductive property, e.g., an insulating material to which conductive particles such as carbon black, carbon nanotubes, carbon nanoplates, or graphite are added, to suppress a non-uniform charge distribution between the cable insulating layer 14 and the metal sheath 22 described below, thereby stabilizing insulation performance. In addition, the outer semiconducting layer 16 may planarize a surface of the cable insulating layer 14 to mitigate electric field concentration in the power cable 100, thus preventing a corona discharge, and physically protect the cable insulating layer 214.

The cable core part 10 may further include a moisture absorbing part 21 to prevent moisture from penetrating the power cable 100. The moisture absorbing part 21 may be provided between the twisted wires of the conductor 11 and/or outside the conductor 11, and provided in the form of powder, a tape, a coating layer, or a film containing a super absorbent polymer (SAP) capable of quickly absorbing moisture permeating the power cable 100 and maintaining a state of absorbing the moisture, thereby preventing permeation of moisture in a longitudinal direction of the power cable 100. In addition, the moisture absorbing layer 21 may have a semiconductive property to prevent a sudden electric field change.

A cable protection part 20 is provided outside the cable core part 10, and the power cable 100 may further include a cable armor 30 when installed at the bottom of the sea. The cable protection part 20 and the cable armor 30 protect the cable core part 10 from various environmental factors, such as moisture penetration, mechanical trauma, and corrosion, which may affect power transmission performance of the power cable 100.

The cable protection part 20 includes the metal sheath 22 and a polymer sheath 24 serving as an anticorrosion layer to protect the power cable 100 from fault current, external forces, and other external environmental factors.

The metal sheath 22 may be provided to surround the cable core part 10. In particular, when the power cable 100 is laid in an environment such as the sea bottom, the cable core part 10 may be sealed to prevent the permeation of foreign substances such as moisture thereinto, and a molten metal may be extruded on the outside of the cable core part 10 to make the cable core part 10 have seamless and continuous outer sides, thereby enhancing watertightness performance. The molten metal may be lead or aluminum, preferably, lead having excellent corrosion resistance to seawater when the power cable 100 is laid at the sea bottom, and more preferably, a lead alloy containing a metal element to reinforce mechanical properties. The metal sheath 22 may be grounded at an end of the power cable 100 to serve as a path through which fault current flows when an accident such as a ground fault or a short circuit occurs, protect the power cable 100 from external shocks, and prevent an electric field from being discharged to the outside of the power cable 100.

Furthermore, an anticorrosion compound, e.g., blown asphalt, may be applied onto a surface of the metal sheath 22 to additionally improve corrosion resistance, watertightness, etc. of the power cable 100 and improve adhesion to the polymer sheath 24.

Furthermore, a nonwoven copper wire tape and a moisture absorbing layer 21 may be additionally provided between the metal sheath 22 and the cable core part 10. The nonwoven copper wire tape includes copper wire, a nonwoven tape, and the like to facilitate electrical contact between the outer semiconducting layer 16 and the metal sheath 22. The moisture absorbing layer 21 is provided in the form of powder, a tape, a coating layer, a film or the like containing a super absorbent polymer (SAP) capable of quickly absorbing moisture permeating the power cable 100 and maintaining a state of absorbing the moisture to prevent penetration of moisture in the longitudinal direction of the power cable 100. In addition, the nonwoven copper wire tape and the moisture absorbing layer 21 may preferably have a semiconductive property to prevent a sudden change in an electric field, and the moisture absorbing layer 21 may include copper wire to be supplied with electric current and to absorb moisture.

The polymer sheath 24 may be provided outside the metal sheath 22 to improve corrosion resistance, watertightness, etc. of the power cable 100 and protect the power cable 100 from other external environmental factors such as mechanical trauma, heat, and ultraviolet rays. The polymer sheath 24 may be formed of a resin such as polyvinyl chloride (PVC) or polyethylene, and preferably, polyethylene resin having excellent watertightness when the power cable 100 is laid at the sea bottom, and preferably, polyvinyl chloride (PVC) resin in an environment requiring flame retardancy.

The power cable 100 may include a metal strip layer 26 outside the polymer sheath 24 in the form of a galvanized steel tape or the like to prevent expansion of the metal sheath 22 due to internal expansion. A bedding layer (not shown) formed of a semiconductive non-woven tape or the like may be provided on and/or below the metal strip layer 26 to buffer an external force applied to the power cable 100, and an outer sheath 28 formed of a resin such as polyvinyl chloride or polyethylene may be further provided to significantly improve corrosion resistance, watertightness, etc. of the power cable 100 and additionally protect the power cable 100 from other external environmental factors such as mechanical trauma, heat, ultraviolet rays, etc.

The power cable 100, when laid at the sea bottom, is likely to be damaged by the anchor of a ship, a bending force applied due to sea currents or waves, friction with the sea bottom, etc., and thus, the cable armor 30 may be provided outside the cable protection part 20 to prevent this problem.

The cable armor 30 may include a metal reinforcing layer 34 and a serving layer 38. The metal reinforcing layer 34 may be formed of steel, galvanized steel, copper, brass, bronze, or the like, formed by cross-winding wire having a round or flat cross-section in at least one layer, enhance mechanical properties and performance of the power cable 100, and additionally protect the power cable 100 from an external force.

The serving layer 38 formed of polypropylene yarn or the like may be provided in one or more layers on and/or below the metal reinforcing layer 34 to protect the power cable 100. The serving layer 38, which is an outermost layer, may be formed of two or more materials of different colors to secure visibility of the power cable 100 laid at the sea bottom.

Figure 3:
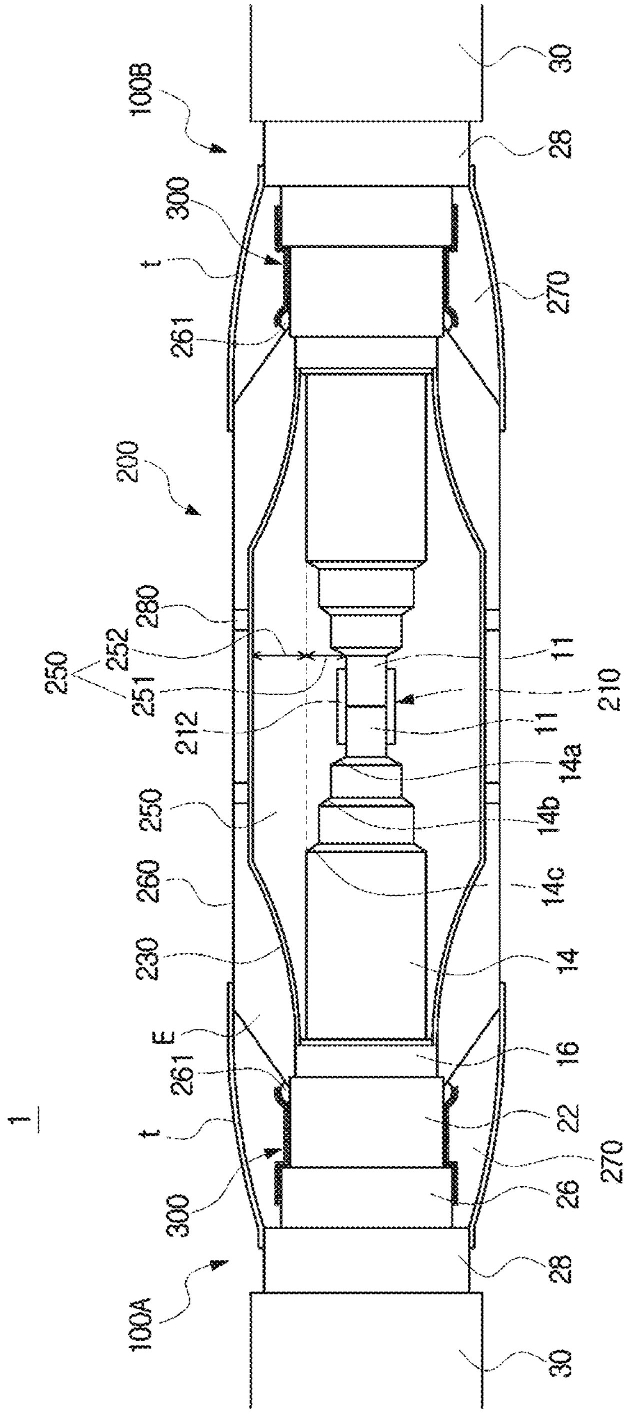
FIG. 3 is a cross-sectional view of a joint system of a power cable according to the present disclosure.

FIG. 3 is a cross-sectional view of a joint system 1 of a power cable according to the present disclosure. More specifically, FIG. 3 is a partial cutaway view schematically illustrating a state in which a power cables 100A and 100B configured as illustrated in FIG. 2 are connected through a joint box 200.

Referring to FIG. 3, the joint system 1 of a power cable according to the present disclosure may include a pair of the power cables 100A and 100B in which conductors 11, inner semiconducting layers 12, cable insulating layers 14, and outer semiconducting layers 16 are exposed and the ends of which face each other; and the joint box 200 including a conductor connection part 210 connecting ends of a pair of the conductors 11, a reinforcing insulating layer 250 surrounding the conductor connection part 210 and the cable insulating layers 14, and a joint-box outer semiconducting layer 230 surrounding the reinforcing insulating layer 250 and electrically connected to the outer semiconducting layers 16 and metal sheaths 22 of the power cables 100A and 100B.

The conductor connection part 210 electrically and mechanically connects the pair of exposed conductors 11, or the pair of exposed conductors 11 may be connected by gripping the ends thereof using a crimp sleeve 212 between the ends of the pair of conductors 11 as shown in FIG. 3 or by filling the pair of conductors 11 with a filler metal.

When the crimp sleeve 212 is used, the crimp sleeve 212 may be a same diameter crimp sleeve, the outer diameter of which becomes substantially the same as those of the pair of the exposed conductors 11, when compressed, and an outer side of the crimp sleeve 212 may be compressed after being inserted into ends of the pair of the exposed conductors 11.

The exposed cable insulating layer 14 is penciled to have multi-step inclined surfaces as illustrated in FIG. 3 but may be penciled to have a single inclined surface.

After the conductors 11 are connected, the reinforcing insulating layer 250 surrounding the conductor connection part 210 and the cable insulating layers 14 may be formed to allow current flowing through the conductors 11 and the conductor connection part 210 to flow only in a longitudinal direction of the joint system 1 and to prevent the current from leaking in a radial direction.

The reinforcing insulating layer 250 may be formed by winding insulating paper to surround the conductor connection part 210 and the exposed inner semiconducting layers (not shown) or the cable insulating layers 14, and the insulating paper used to form the reinforcing insulating layer 250 may be composite insulating paper having excellent dielectric strength.

The reinforcing insulating layer 250 may be provided by winding insulating paper to surround the conductor connection part 210 and the exposed inner semiconducting layers (not shown) or the cable insulating layers 14, and include a first reinforcing insulating layer 251 extending to an outer diameter of the cable insulating layer 14 and a second reinforcing insulating layer 252 surrounding the cable insulating layer 14 and the first reinforcing insulating layer 251.

A spacer 280 may be provided to maintain a gap between a protective copper tube 260, which will be described below, and the joint-box outer semiconducting layer 230. The spacer 280 may be formed of a metal material and provided outside a linear portion of the joint-box outer semiconducting layer 230.

In addition, outermost portions of the power cable 100A and 100B and the joint box 200 are covered with the protective copper tube 260. The protective copper tube 260 may protect the inside of the joint box 200 from the outside, be electrically connected to the metal sheath 22 of the power cable 100, and serve as a fault current path.

The insulation performance of the joint system 1 should be ensured by injecting insulating oil into the joint box 200. Specifically, when a space between the reinforcing insulating layer 250 and the protective copper tube 260 is filled with the insulating oil and particularly, the reinforcing insulating layer 50 is provided by winding paper impregnated half with oil, the reinforcing insulating layer 250 should be impregnated with the insulating oil to improve insulation performance.

The protective copper tube 260 of the present disclosure may include an intake pipe (not shown) and a discharge pipe (not shown) of the insulating oil. The intake pipe and the discharge pipe are provided on an outer side of the protective copper tube 260 in opposite directions and serve as a moving path of the insulating oil.

The insulating oil supplied into the protective copper tube 260 through the intake pipe is discharged to the outside through the discharge pipe above the intake pipe while impregnating the reinforcing insulating layer 250 through the joint-box outer semiconducting layer 230. Alternatively, the insulating oil may be pressurized using a nitrogen gas or the like to smoothly impregnating the reinforcing insulating layer 250 with the insulating oil, thereby improving insulation performance.

The joint box 200 may further include a leaded part 261 at an interface between the metal sheath 22 of the cable and the protective copper tube 260.

The metal sheath 22 may be formed of a material such as a lead sheath, and the leaded part 261 may be formed by soldering a boundary area between the metal sheath 22 and the protective copper tube 260 using a torch or the like. In order to improve pressure-resisting quality of the leaded part 261, a method of increasing a range or size, e.g., a length and thickness, of the leaded part 261 may be considered but an inner semiconducting layer or insulating layer may be damaged by heat applied in a soldering process and thus this method is limited.

The leaded part 261 may be provided for sealing the insulating oil accommodated in the protective copper tube 260. It was confirmed that the insulating oil may expand or contract according to a temperature and an internal pressure thereof may reach at least 30 bar according to a measurement result.

The protective copper tube 260 is composed of a thickness and a material capable of withstanding the inner pressure in the case of the above protection, thereby, but there is no problem in which a problem such as fatigue destruction is not occurring, but the portion of the cable (22) and the protective copper tube (260) The conjugated portion 261 may be damaged by repeated internal pressure change or the like.

To solve this problem, a joint system of a power cable according to the present disclosure, which includes a joint box for connection of a pair of power cables, may include: a pair of power cables 100A and 100B in which conductors 11, inner semiconducting layers, insulating layers 14 formed of insulating paper, outer semiconducting layers 16, metal sheaths 22, and metal strip layers 26 are exposed and which are connected such that the conductors 10 face each other; a conductor connection part 210 to which the exposed conductors 11 of the pair of power cables 100A and 100B are connected; a reinforcing insulating layer 250 covering the conductor connection part 210 and the exposed insulating layers 14 of the pair of power cables 100A and 100B; a joint-box outer semiconducting layer 230 provided outside the reinforcing insulating layer 250 to be connected to the exposed outer semiconducting layers 16 of the pair of power cables 100A and 100B; a protective copper tube 260 provided outside the joint-box outer semiconducting layer 230 and filled with the insulating oil; a leaded part 261 located in a boundary area between the pair of power cables 100A and 100 and an outer end of the protective copper tube 260 while in contact with an end of the protective copper tube 260 and the metal sheath 22; and a leaded-part reinforcing part 300 including a reinforcing member 301 in the form of wire on at least a portion of a surface of the leaded part 261.

As shown in FIG. 3, both sides of the protective copper tube 260 are configured as inclined surfaces, lower ends of the sides of the protective copper tube 260 are in contact with the exposed metal sheath 22 of the power cable 100, the leaded part 261 covers a lower end of a side of the protective copper tube 260 and a portion of the exposed metal sheath 22 of the power cable 100, and the reinforcing member 301 that is in the form of wire may be wound around a surface of the leaded part 261 to prevent damage to the leaded part 261. The reinforcing member 301 may be formed of a metal material to have sufficient rigidity.

A tin-plated annealed copper wire may be used as an example of the reinforcing member 301. This is to ensure sufficient pressure-resistance performance and workability for formation of the leaded-part reinforcing part.

The tin-plated annealed copper wire may be cross wound around the surface of the leaded part 261, so that an increase in the inner pressure of the insulating oil may be withstood even when the inner pressure of the protective copper tube 260 increases.

It was confirmed that the tin-plated annealed copper wire, when used as the reinforcing member 301, preferably has a width of 1.0 mm to 3.0 mm to ensure sufficient pressure-resistance performance and facilitate a cross-winding process for formation of the leaded-part reinforcing part. In addition, as shown in FIG. 3, the tin-plated annealed copper wire may be wound in multiple layers. The number of layers in which the tin-plated annealed copper wire is cross wound may be variously changed according to pressure-resistance performance required for a joint box, the size of the joint box or a leaded part, and the like.

For finishing, a molding part 270 formed of a material such as epoxy may be provided outside the leaded part 261, and an end of the protective copper tube 260 and the molding part 270 may be finished with a heat shrinkable tube t.

Figure 4:
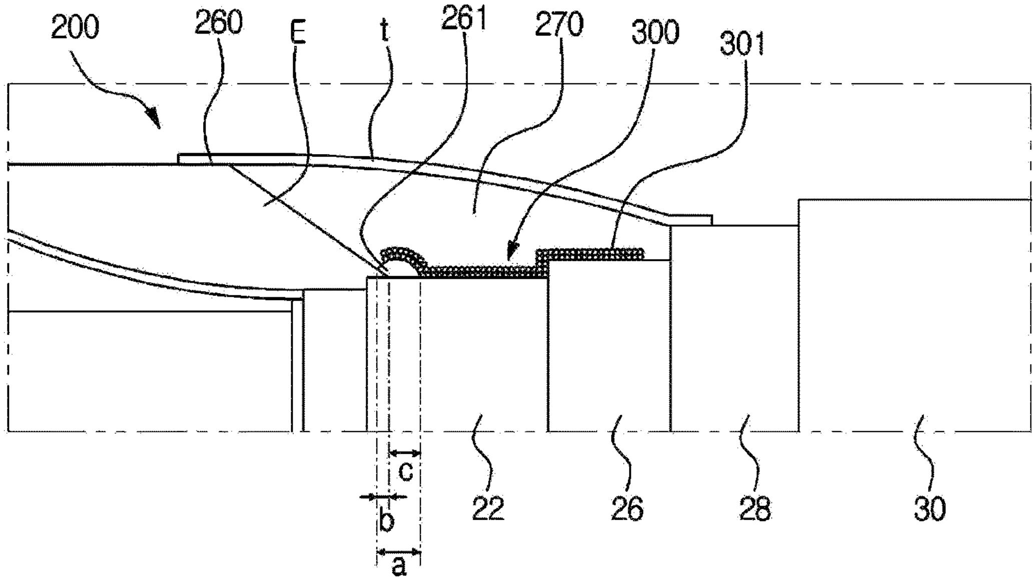
FIG. 4 is an enlarged cross-sectional view of a boundary area of a protective copper tube of the joint system of a power cable of FIG. 3.

FIG. 4 is an enlarged cross-sectional view of a boundary area of a protective copper tube of the joint system 1 of the power cable of FIG. 3.

As shown in FIG. 4, it is preferable to cross-wind the reinforcing member 301 to a position at which the reinforcing member 301 overlaps the protective copper tube 260 in the radial direction of the power cable 100.

That is, as shown in FIG. 4, a whole sealing area a of the leaded part 261 in the longitudinal direction of the power cable 100 may be divided into a region b in which the leaded part 261 and the protective copper tube 260 overlap in the radial direction of the power cable 100 and a region c in which the leaded part 261 and the protective copper tube 260 do not overlap in the radial direction of the power cable 100.

In the embodiment of in FIG. 4, an installation range of the leaded-part reinforcing part 300 will be described. The reinforcing member 301 may be cross-wound to continuously cover an outer circumferential surface of the leaded part, an exposed metal sheath of the power cable, and at least a portion of a metal strip layer, thereby forming a leaded-part reinforcing part.

Specifically, it was confirmed that the pressure-resisting quality or durability of the leaded part 261 was not influenced when the region c and 20% or more of the region b were covered with the reinforcing member 301, even under an extreme condition in which inner pressure increased up to 67 bar.

In connection with an outer end of the leaded-part reinforcing part 300, at least an end region of the exposed metal strip layer 26 is also preferably covered with the reinforcing member 301 as illustrated in FIG. 4.

Although the metal strip layer 26 has sufficient pressure-resistance performance, it is difficult to suppress swelling of the metal sheath 22 in an exposed end region of the metal strip layer 22 and thus it is necessary to also cover the end region of the metal strip layer 26 with the reinforcing member 301, thereby reinforcing pressure-resistance performance.

In addition, although in the embodiment of FIG. 4, the reinforcing member 301 of the leaded-part reinforcing part 300 is illustrated as covering a region of the metal strip layer 26, including the exposed end of the metal strip layer 26, the entire exposed metal strip layer 26 may be covered with the reinforcing member 301 to maximize the pressure-resistance performance of the leaded-part reinforcing part.

Furthermore, the leaded-part reinforcing part may be configured by covering at least a portion of an outer circumferential surface of the external sheath 28 with the reinforcing member 301 to reinforce pressure-resistance performance.

Figure 5:
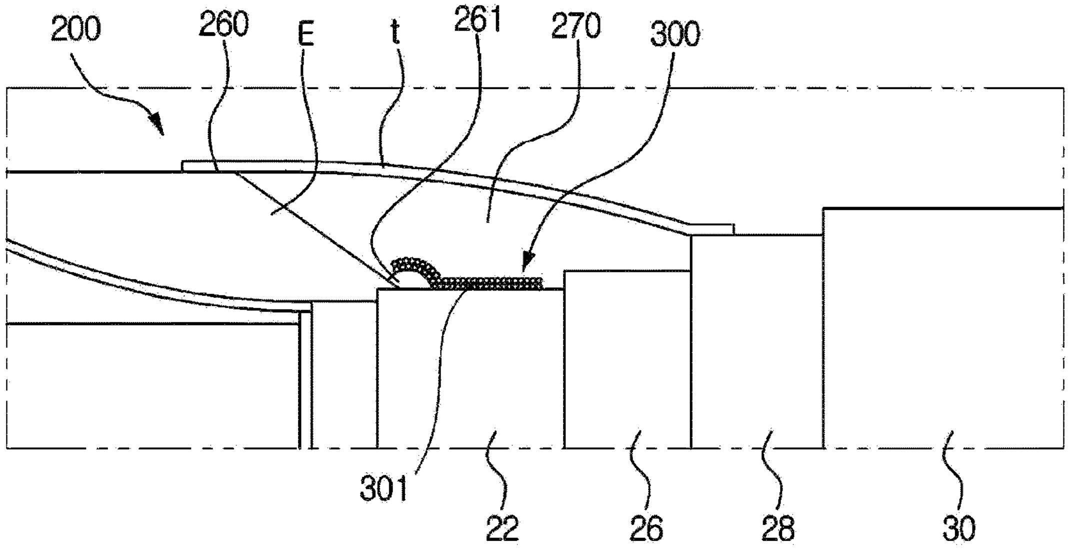
FIG. 5 is an enlarged cross-sectional view of a boundary area of a protective copper tube of a joint system of a power cable according to another embodiment of the present disclosure.

FIG. 5 is an enlarged cross-sectional view of a boundary area of a protective copper tube of a joint system of a power cable according to another embodiment of the present disclosure. In the embodiment of FIG. 5, a reinforcing member 301 covers at least a portion of an outer circumferential surface of a leaded part 261 and at least a portion of an exposed metal sheath 22 of the power cable, unlike in the embodiment of FIG. 4.

A metal strip layer 26 of the power cable is formed by winding metal strips in the form of a metal tape having sufficient rigidity and thus has sufficient pressure-resistance performance when an end of the metal strip layer 26 is finished to be appropriately firmly adhered or fixed, and thus the leaded-part reinforcing part 300 may be formed by winding at least a portion of a metal sheath, which is adjacent to at least a portion of the leaded part, with the reinforcing member 301.

Figure 6:
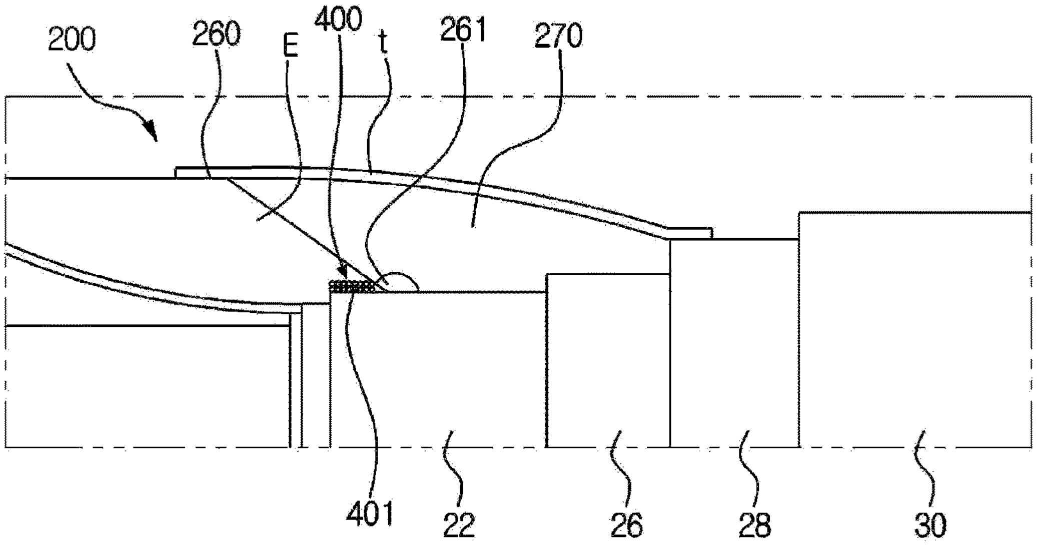
FIG. 6 is a cross-sectional view of a joint system of a power cable according to another embodiment of the present disclosure.

FIG. 6 is a cross-sectional view of a joint system of a power cable according to another embodiment of the present disclosure.

The joint system of a power cable, which includes a joint box for connection of a pair of power cables, illustrated in FIG. 6 may include: a pair of power cables 100A and 100B in which conductors 11, inner semiconducting layers, insulating layers 14 formed of insulating paper, outer semiconducting layers 16, metal sheaths 22, and metal strip layers 26 are exposed and which are connected to each other such that the conductors 10 face each other; a conductor connection part 210 to which the exposed conductors 11 of the pair of power cables 100A and 100B are connected; a reinforcing insulating layer 250 covering the conductor connection part 210 and the exposed insulating layers of the pair of power cables 100A and 100B; a joint-box outer semiconducting layer 230 provided outside the reinforcing insulating layer 250 to be connected to the exposed outer semiconducting layers 16 of the pair of power cables 100A and 100B; a protective copper tube 260 provided outside the joint-box outer semiconducting layer 230 and filled with insulating oil; and a metal sheath reinforcing layer 400 including a reinforcing member 401, which is in the form of wire and covers end portions of the metal sheaths 22 exposed in the protective copper tube 260 to reinforce the end portions of the metal sheaths 22.

In the embodiment of FIG. 6, a metal sheath reinforcing part 400 may be formed by cross-winding a reinforcing member 401, which has the same shape or material as a reinforcing member 301 of the leaded-part reinforcing part 300, around an end region of the exposed metal sheath 22 disposed in the protective copper tube 260 in the same way to prevent or minimize damage or modification to, e.g., expansion of, the end region of the metal sheath 22 due to an increase in an inner pressure of the protective copper tube 260 of the joint system.

The leaded part 261 is configured to join the exposed metal sheath 22 and a boundary area of the protective copper tube 260, but an end of the metal sheath 22 disposed in the protective copper tube 260 is also preferably reinforced using a metal-sheath reinforcing part because the leaded part 261 may be damaged due to medication or damage of an end region of the exposed metal sheath 22 in the protective copper tube 260 when an inner pressure of the protective copper tube 260 increases. The metal sheath reinforcing part 400 that reinforces the metal sheath 22 by winding the end region of the exposed metal sheath 22 inside the protective copper tube 260 with the reinforcing member 401 may be applied together with the reinforcement unit 300 or independently.

As described above, pressure-resistance performance of a boundary area between the joint box 200 and the power cable 100 may be significantly improved by configuring the leaded-part reinforcing part 300 by adding the reinforcing member 301 to the leaded part 261 or configuring the metal sheath reinforcing part 400 by adding the reinforcing member 401 to an end of the metal sheath 22 in the protective copper tube 60 without changing the structure of the joint box 200 for connection of power cables.

Figure 7:
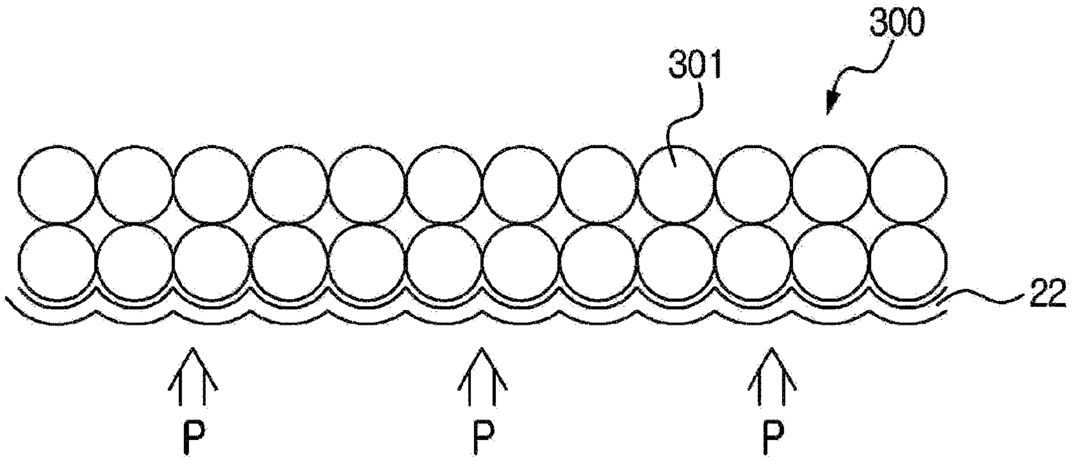
FIG. 7 is an enlarged cross-sectional view of a leaded-part reinforcing part of a joint system of a power cable according to an embodiment of the present disclosure.
Figure 8:
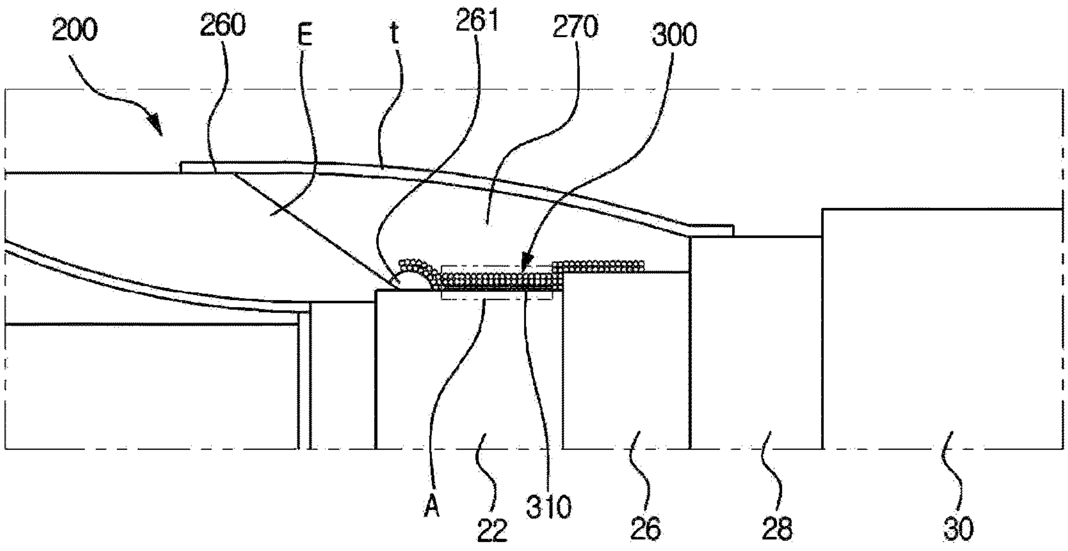
FIG. 8 is an enlarged cross-sectional view of a boundary area of a protective copper tube of a joint system of a power cable according to another embodiment of the present disclosure.
Figure 9:
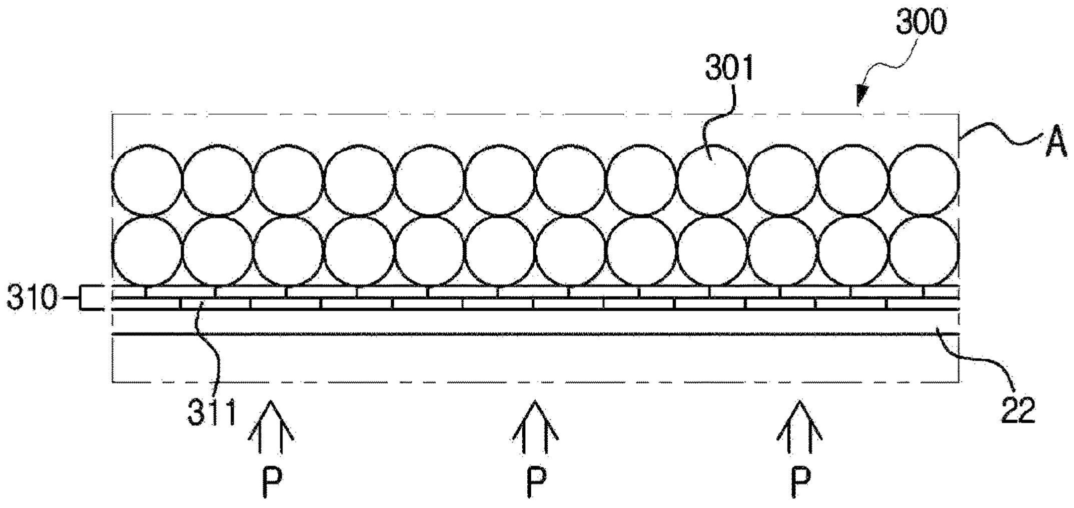
FIG. 9 is an enlarged view of a leaded-part reinforcing part illustrated in FIG. 8.

FIG. 7 is an enlarged cross-sectional view of a leaded-part reinforcing part of a joint system of a power cable according to an embodiment of the present disclosure. FIG. 8 is an enlarged cross-sectional view of a boundary area of a protective copper tube of a joint system 1 of a power cable according to another embodiment of the present disclosure. FIG. 9 is an enlarged cross-sectional view of a leaded-part reinforcing part of a joint system of a power cable according to an embodiment of the present disclosure.

As described above, the reinforcing members 301 and 401 may be wound around the leaded part 361 or the metal sheath 22 to pressure-resistance performance.

However, the metal sheath 22 may be formed of a flexible material such as a lead sheath unlike the leaded part 361 formed by soldering or the like. Thus, even when a reinforcing member is densely wound around the outer circumferential surface of the metal sheath 22 as illustrated in FIG. 7, a region of the metal sheath 22, which is not directly supported by the reinforcing member, may deform according to a shape of a clearance or gap when an inner pressure of the metal sheath 22 increases, thereby corrugating the metal sheath 22 in a circumferential direction of the outer circumferential surface of the metal sheath 22. When pressure is repeatedly applied to deformed portions of the method 22, a fatigue failure may occur.

In order to reinforce the metal sheath 22, a taping reinforcement layer 310 may be further provided between the reinforcing member 301 and the metal sheath 22 as shown in FIGS. 9 and 9.

That is, in a region A shown in FIGS. 8 and 9, when the taping reinforcing layer 310 is configured by adding a tape to which a tensile fiber is added in at least one layer, and preferably, in multiple layers, on the outer circumferential surface of the metal sheath 22 and the reinforcing member 301 is thereafter cross-wound thereabout, the metal sheath 22 may be prevented from being deformed due to a clearance of the reinforcing member 301 or like, even the inner pressure of the metal sheath 22 increases, thereby improving durability of the joint system.

Although FIG. 8 illustrates that the leaded-part reinforcing part 300 includes the taping reinforcement layer 310, a taping reinforcing layer may be provided between the metal sheath 22 and the reinforcing member 401 of the metal sheath reinforcing layer 400 illustrated in FIG. 6.

Figure 10:
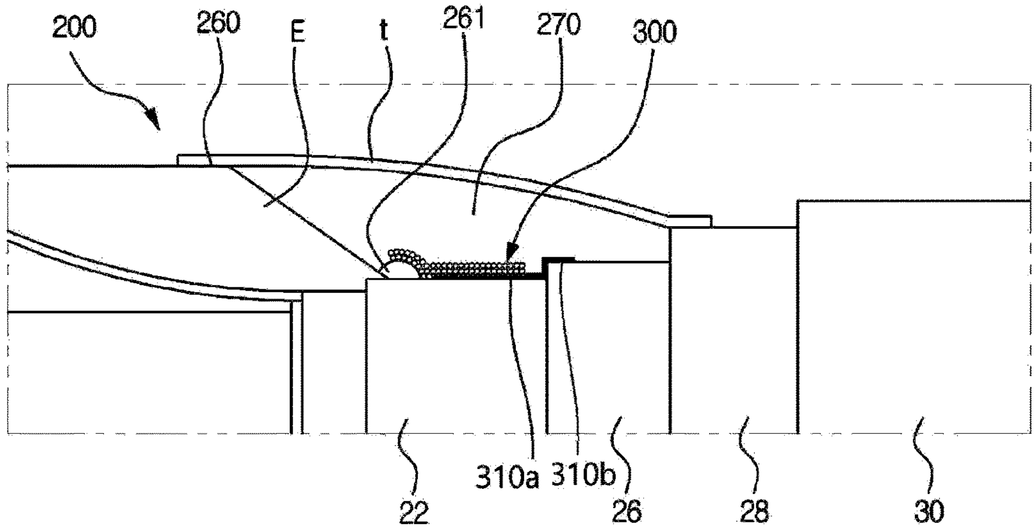
FIGS. 10 and 11 are enlarged cross-sectional views of boundary areas of protective copper tubes of joint systems of a power cable according to other embodiment of the present disclosure.
Figure 11:
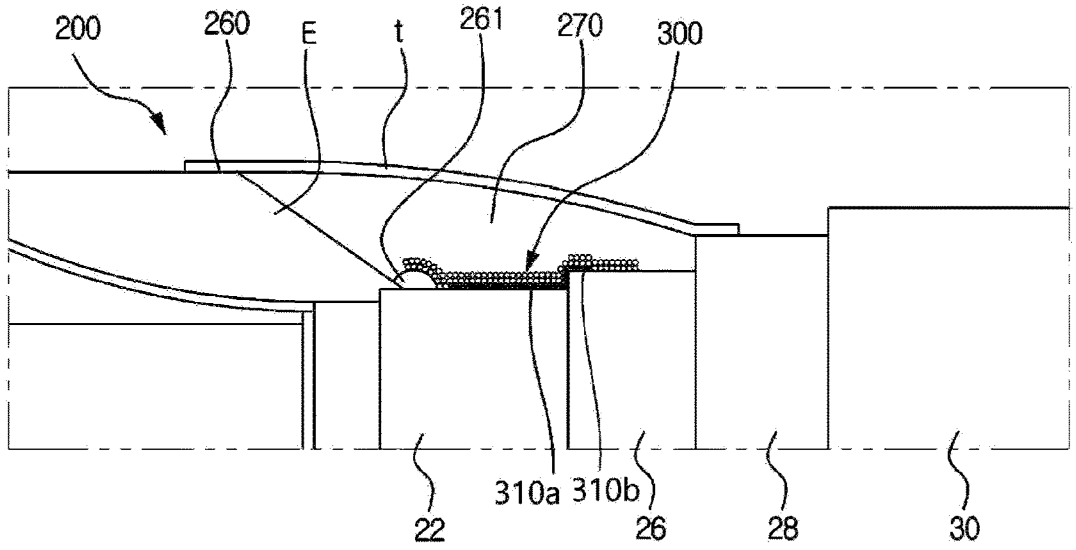

FIGS. 10 and 11 are enlarged cross-sectional views of boundary areas of protective copper tubes of joint systems of a power cable according to other embodiment of the present disclosure. FIGS. 10 and 11 illustrate embodiments in which a taping reinforcing layer 310 extends to an end of a metal strip layer 26, as well as an entire area of an exposed metal sheath 22.

In the embodiment of FIG. 8, the reinforcing member 301 is wound about the leaded-part reinforcing part 300 to reinforce the leaded part 261, the exposed metal sheath 22 and a portion of the metal strip layer 26, and the taping reinforcing layer 310 configured by winding the reinforcing tape 301 may be provided between the exposed metal sheath 22 of the power cable and the reinforcing member 301.

However, in the embodiment of FIG. 10, the leaded-part reinforcing part 300 is configured by winding the reinforcing member 301 around only at least a portion of a leaded part and at least a portion of the metal sheath 22 adjacent thereto as illustrated in FIG. 5, and the taping reinforcing layer 310 may extent to an end of a metal strip layer 26, as well as the entire exposed metal sheath 22, unlike the leaded-part reinforcing part 300.

In the embodiment of FIG. 10, the taping reinforcing layer 310 may prevent deformation of the metal sheath 22 of the power cable due to an inner pressure of the metal sheath 22 and allow an end of the metal strip layer 26 to be firmly fixed on the metal sheath 22.

In the embodiment shown in FIG. 11, the reinforcing member 301 for configuring the leaded-part reinforcing part 300 may continuously cover at least a portion of an outer circumferential surface of the leaded part 261, the entire exposed metal sheath 22 of the power cable, and at least a portion of the metal strip layer 26, and in this case, the taping reinforcing layer 310 may extend to cover the end of the metal strip layer 26 and ranges of the taping reinforcing layer 310 and the leaded-part reinforcing part 300 are variable. That is, the size of the taping reinforcement layer 310 may be increased or the range of the leaded-part reinforcing part 300 may be increased as illustrated in FIG. 11.

That is, a taping reinforcing layer of a joint system of a power cable according to the present disclosure may be provided in at least a region of a region in which a reinforcing member and a metal sheath overlap, and the taping reinforcing layer and the leaded-part reinforcing part may partially overlap but may not overlap entirely and the ranges thereof may be increased or reduced as needed.

Figure 12:
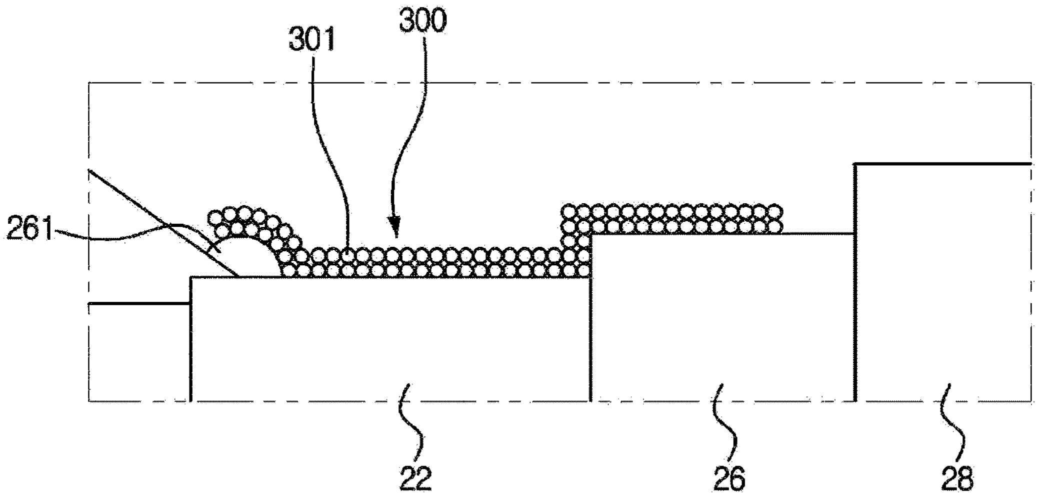
FIGS. 12 to 14 are enlarged cross-sectional views of boundary areas of protective copper tubes of joint systems of a power cable according to other embodiment of the present disclosure.
Figure 13:
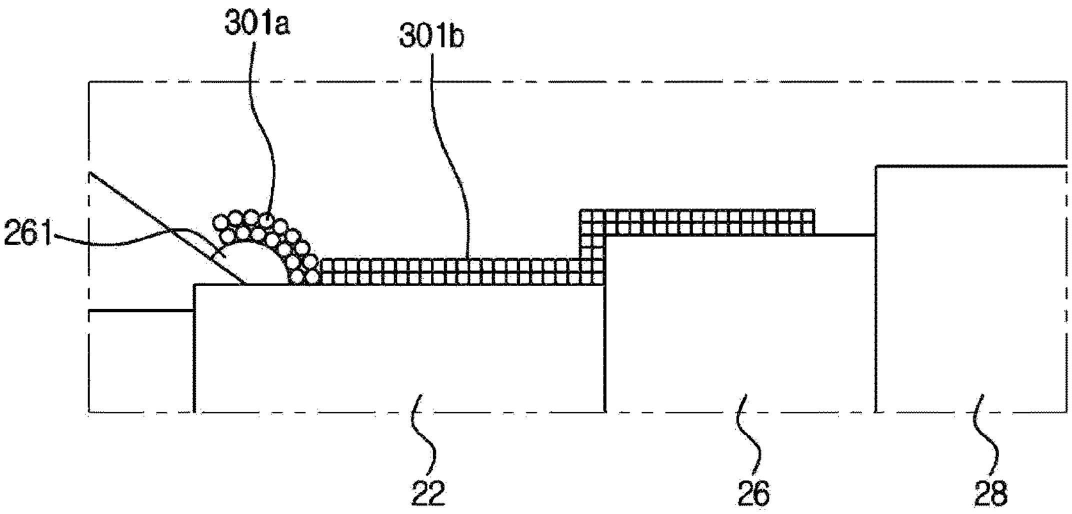
Figure 14:
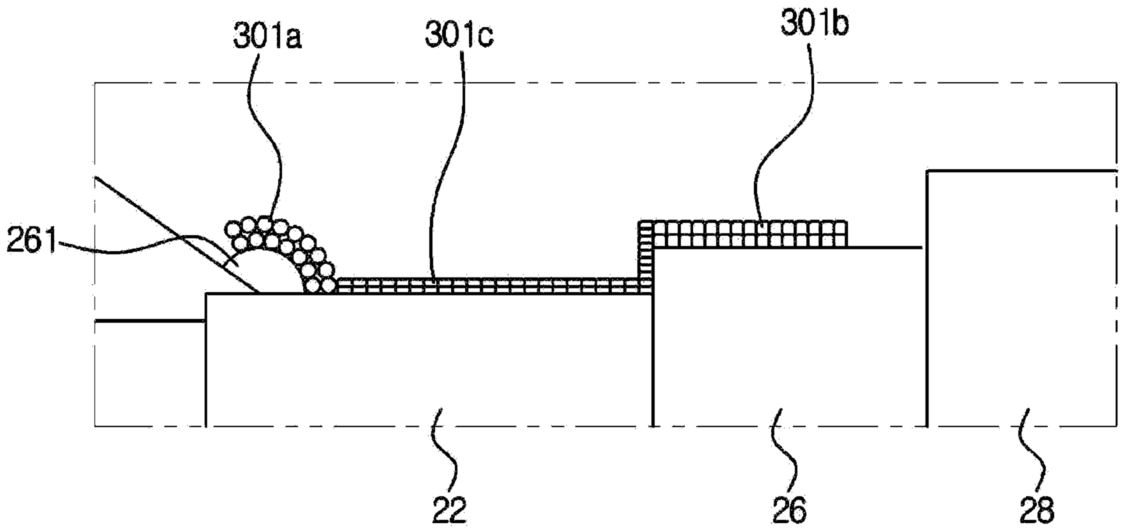

FIGS. 12 to 14 are enlarged cross-sectional views of boundary areas of protective copper tubes of joint systems 1 of a power cable according to other embodiment of the present disclosure.

The above-described leaded-part reinforcing part or metal sheath reinforcing part may be configured by winding a reinforcing member 301 having a round cross section in multiple layers as shown in FIG. 12.

However, as needed, a plurality of reinforcing members may be joined by soldering or the like to form a leaded-part reinforcing part or a metal sheath reinforcing part.

A cross section of the reinforcing member 301 may have a circular shape, an oval shape, a track type, or a polygonal shape with rounded corners, and a leaded part region may be reinforced by winding a reinforcing member 301*a* having a circular cross section and a metal sheath region may be reinforced by winding a reinforcing member 301*b* having a tetragonal shape with rounded corners as shown in FIG. 13 to obtain a dual system of the reinforcing members 301*a* and 301*b* of a curved region and a flat region, thereby minimizing a clearance of the reinforcing member 301 on an outer circumferential surface of the metal sheath 22, which is a flat region and lessening corrugations of the outer circumferential surface of the metal sheath 22. The corners of a reinforcing member having a polygonal cross section may be rounded to prevent scratching of the metal sheath.

The reinforcing member 301*a* having the circular cross section and the reinforcing member 301*b* having a square cross section may be joined together in a boundary region therebetween and cross-wound similar to a continuous reinforcing member.

As shown in FIG. 14, the reinforcing member may be configured to have three or more types of cross sections.

That is, the reinforcing member 301*a* having the circular cross section, the reinforcing member 301*b* having a rectangular shape with rounded corners, and a reinforcing member 301*c* having a square shape with rounded corners may be respectively wound around outer circumferential surfaces of a leaded part, a metal sheath, and a metal strip layer.

That is, a reinforcing member having a cross section matching a location may be applied, e.g., a flat and rectangular reinforcing member with rounded corners may be applied to the outer circumferential surface of the metal sheath, which is a long region having a flat cross section, thereby significantly reinforcing pressure-resistance performance.

While the present disclosure has been described above with respect to exemplary embodiments thereof, it would be understood by those of ordinary skilled in the art that various changes and modifications may be made without departing from the technical conception and scope of the present disclosure defined in the following claims. Thus, it is clear that all modifications are included in the technical scope of the present disclosure as long as they include the components as claimed in the claims of the present disclosure.

The invention claimed is:

1. A joint system of a power cable, which includes a joint box for connection of a pair of power cables, the joint system comprising:

- a pair of power cables connected to each other such that conductors, inner semiconducting layers, insulating layers formed of insulating paper, outer semiconducting layers, metal sheaths, and metal strip layers thereof are exposed and the conductors face each other;
- a conductor connection part to which the exposed conductors of the pair of power cables are connected;
- a reinforcing insulating layer configured to cover the conductor connection part and the exposed insulating layers of the pair of power cables;
- a joint-box outer semiconducting layer provided outside the reinforcing insulating layer to be connected to the exposed outer semiconducting layers of the pair of power cables;
- a protective copper tube provided outside the joint-box outer semiconducting layer and filled with insulating oil;
- a leaded part provided at boundary area between the power cable and the protective copper tube while in contact with end portions of the protective copper tube and the metal sheath; and
- a leaded-part reinforcing part configured to cover at least a portion of a surface of the leaded part.

2. The joint system of claim 1, wherein both sides of the protective copper tube are inclined sides, lower ends of the both sides of the protective copper tube are in contact with the exposed metal sheath of the power cable, and the leaded part covers the lower ends of the both sides of the protective copper tube and a portion of the exposed metal sheath of the power cable.

3. The joint system of claim 2, wherein a reinforcing member of the leaded-part reinforcing part continuously covers at least a portion of an outer circumferential surface of the leaded part and at least a portion of the exposed metal sheath of the power cable.

4. The joint system of claim 3, wherein the reinforcing member of the leaded-part reinforcing part covers at least a portion of a side of the protective copper tube in a radial direction of the power cable.

5. The joint system of claim 4, wherein the reinforcing member of the leaded-part reinforcing part covers at least 20 percentages of the side of the leaded part covering the protective copper tube in a longitudinal direction of the power cable.

6. The joint system of claim 3, wherein the reinforcing member of the leaded-part reinforcing part covers a region of the metal strip layer, including an end portion of the exposed metal strip layer.

7. The joint system of claim 3, wherein the reinforcing member of the leaded-part reinforcing part covers the entire exposed metal strip layer.

8. The joint system of claim 3, further comprising a taping reinforcing layer in at least a region of an area in which the reinforcing member and the metal sheath overlap each other.

9. The joint system of claim 8, wherein the taping reinforcing layer is formed by cross-winding a tape, to which a tensile fiber is added, in at least one layer around the outer circumferential surface of the metal sheath.

10. The joint system of claim 1, wherein the reinforcing member comprises a tin-plated annealed copper wire.

11. The joint system of claim 10, wherein the tin-plated annealed copper wire has a width of 1.0 mm to 3.0 mm.

12. The joint system of claim 1, wherein the tin-plated annealed copper wire is cross-wound in multiple layers in a radial direction of the power cable.

13. The joint system of claim 1, wherein a cross section of the reinforcing member has a circular shape, an elliptical shape, a track shape, or a polygonal shape with rounded corners.

14. The joint system of claim 1, wherein a plurality of reinforcing members of a leaded-part reinforcing part are connected by being joined together.

15. The joint system of claim 14, wherein a cross-section of at least one of a plurality of reinforcing members is different from those of the other reinforcing members.

16. The joint system of claim 14, wherein a cross section of a reinforcing member covering the exposed metal sheath among the plurality of reinforcing members has a tetragonal shape with rounded corners.

17. The joint system of claim 1, further comprising a metal-sheath reinforcing part including the reinforcing member covering an end portion of the metal sheath exposed inside the protective copper tube.

18. The joint system of claim 8, wherein the taping reinforcing layer extends to a region including an end of the metal strip layer.

19. A joint system of a power cable, which includes a joint box for connection of a pair of power cables, the joint system comprising:

a pair of power cables connected to each other such that conductors, inner semiconducting layers, insulating layers formed of insulating paper, outer semiconducting layers, metal sheaths, and metal strip layers are exposed, and the conductors face each other;

a conductor connection part to which the exposed conductors of the pair of power cables are connected;

a reinforcing insulating layer configured to cover the conductor connection part and the exposed insulating layers of the pair of power cables;

a joint-box outer semiconducting layer provided outside the reinforcing insulating layer to be connected to the exposed outer semiconducting layers of the pair of power cables;

a protective copper tube provided outside the joint-box outer semiconducting layer and filled with insulating oil; and a metal-sheath reinforcing part including a reinforcing member configured to cover an end portion of the metal sheath inside the protective copper tube.

20. A joint system of a power cable, which includes a joint box for connection of a pair of power cables, wherein the pair of power cables are connected to each other such that conductors, inner semiconducting layers, insulating layers formed of insulating paper, outer semiconducting layers, metal sheaths, and metal strip layers are exposed, and the conductors face each other, the joint box comprises: a conductor connection part configured to connect the pair of the exposed conductors; a reinforcing insulating layer configured to cover the conductor connection part and the insulating layers of the pair of power cables; a joint-box outer semiconducting layer provided outside the reinforcing insulating layer to be connected to the outer semiconducting layers of the pair of power cables; and a protective copper tube provided outside the joint-box outer semiconducting layer and filled with insulating oil, the joint system further comprises:

a leaded part provided in a boundary area between the power cable and the protective copper tube; and a reinforcing member configured to continuously cover an end region of the metal sheath inside the protective copper tube or at least a portion of an outer circumferential surface of the leaded part and at least a portion of the metal sheath of the power cable.

* * * * *